United States Patent Office 3,541,210
Patented Nov. 17, 1970

---

3,541,210
17-ALPHA-(2-BUTYN-1-YL)-SUBSTITUTED STEROIDS
Eugene E. Galantay, Morristown, N.J., assignor to Sandoz-Wander, Inc., Hanover, N.J., a corporation of Delaware
No Drawing. Filed Apr. 10, 1968, Ser. No. 720,342
Int. Cl. C07c 169/08
U.S. Cl. 424—243           6 Claims

ABSTRACT OF THE DISCLOSURE

The compounds are 17α-substituted gonane derivatives, e.g., 17α - (2' - butyn - 1' - yl) - estra - 4 - en - 17β - ol-3-one. The compounds have estrogenic/progestational activity.

---

This invention relates to substituted gonanes. More particularly it relates to 17α-substituted-13-alkyl-17β-hydroxy gonanes and to the preparation thereof, as well as intermediates therefor.

The substituted gonanes of this invention may be represented by the formula

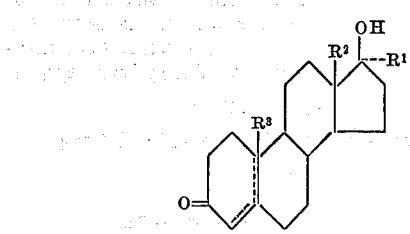

(I)

wherein $R^1$ is —CH$_2$—C≡C—CH$_3$ (2'-butyn-1'-yl) or

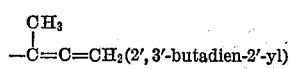

$R^2$ is alkyl having 1 to 3 carbon atoms, and
$R^3$ is H when the double bond is in the 4,5-position.

The preferred compounds of this invention are 17α-(2'-butyn-1'-yl)-estra-5(10)-en-17β-ol-3-one

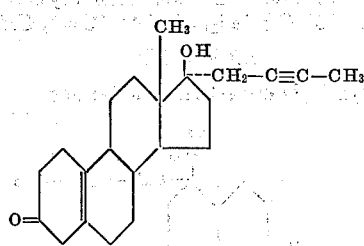

(Ia)

17α-(2'-butyn-1'-yl)-estra-4-en-17β-ol-3-one

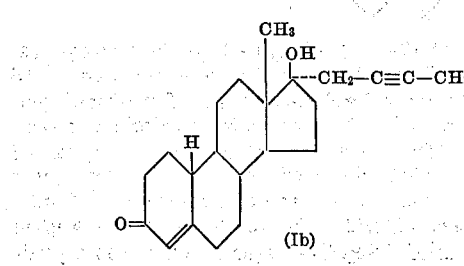

(Ib)

17α-(2',3'-butadien-2'-yl)-estra-4-en-17β-ol-3-one

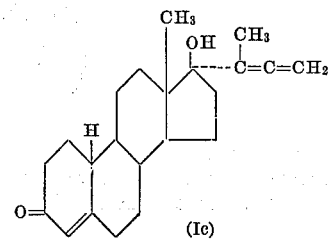

(Ic)

and 17α-(2',3'-butadien-2'-yl)-estra-5(10)-en-17β-ol-3-one

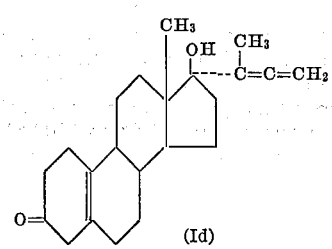

(Id)

The process for preparing the compounds of Formula I may be represented by the following reaction scheme A:

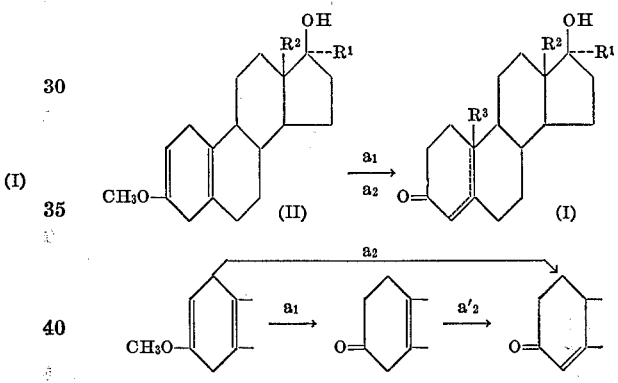

Compounds (I) where $R^1$, $R^2$ and $R^3$ have the above-stated significance are prepared by treating a corresponding substituted gonane (II) where $R^1$ and $R^2$ have the above-stated significance, with acid in an aqueous medium. The reaction may be carried out at temperatures from 0° to 50° C.

Step $a_1$ is a mild hydrolysis, effected, preferably, with oxalic acid, acetic acid or generally in acid media with a pH value above 2 and preferably between 3 and 5.

Step $a_2$ is more vigorous hydrolysis or rearrangement, effected preferably with hydrochloric acid. The pH value is lower than that of step $a_1$ and preferably between 1 and 2. Step $a'_2$ may also be performed under mild acid conditions, wherein the reaction is carried out for a longer period of time and at a higher temperature than under strong acid conditions.

Compounds (II) may be prepared in accordance with the following reaction scheme:

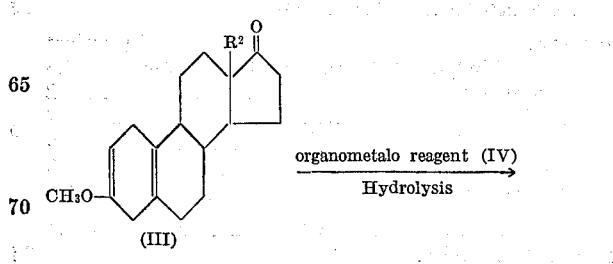

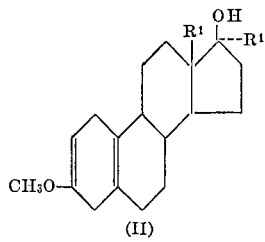

(II)

wherein R[1] and R[2] have the above-stated significance.

The organometalo reagent (IV) is prepared by reacting in an aprotic solvent such as ether, CH₃—C≡C—CH₂X or

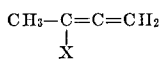

where X is chlorine, bromine or iodine with a metal such as magnesium, zinc, lithium or aluminum. Compound (II) is prepared by reacting the resulting reagent (IV) with a corresponding 3-methoxygona-2,5(10)-dien-17-one (III) at a temperature of 0° to 100° C., preferably 30° to 50° C., followed by hydrolysis of the resulting adduct in neutral aqueous medium, e.g., water or saturated ammonium chloride solution.

Conventional recovery techniques are utilized for obtaining the compounds (I) and (II).

Certain compounds of Formula III are known and are prepared by methods disclosed in the literature. Those compounds of Formula III not specifically disclosed are prepared according to analogous methods from known materials.

The gonane derivatives represented by Formula I above are useful because they possess pharmacological properties in animals. In particular, such compounds are useful as ovulation inhibiting agents in animals. Compounds (I) possess progestational activity as indicated either by the test method basically described by R. L. Elton et al., Experienta vol. XXII (1966) wherein the rabbit is given 4 milligrams of active agent per day for 8 days; or by the method basically described in Endocrinology 63 (1958) 464 wherein the rabbit is given 0.01 to 1.0 milligrams of active agent. Compound (Ib) possesses estrogenic activity in the rat as determined by the method basically described in Endocrinology 65 (1959) and Am. J. Physiol. 189 (1957) 355, respectively.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.05 milligrams to 10 milligrams. This daily dosage is preferably given in equally divided doses, e.g., 1 to 2 times a day, or in sustained release form. It will be appreciated by those skilled in the art, that the daily dosage level is independent of body weight. Dosage forms suitable for internal administration comprise from about 0.025 milligrams to about 10 milligrams of the compound in admixture with a solid or liquid pharmaceutical carrier or diluent.

A representative formulation suitable for oral administration is a tablet prepared by standard tabletting techniques which contains the following:

| Ingredients: | Parts by weight |
|---|---|
| 17α-(2′-butyn-1′-yl)-estra-4-en-17β-ol-3-one | 2.5 |
| Tragacanth | 2 |
| Lactose | 87 |
| Corn starch | 5 |
| Talcum | 3 |
| Magnesium stearate | 0.5 |

This invention is illustrated but not limited by the following examples.

EXAMPLE 1

17α-(2′-butyn-1′-yl)-3-methoxyestra-2,5(10)-dien-17β-ol

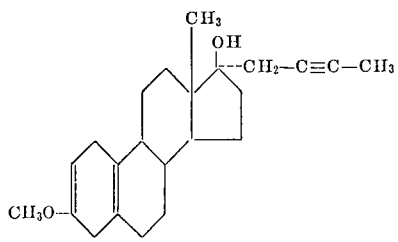

A Grignard mixture was prepared from 4.08 grams of magnesium turnings and 24.6 grams of 2-butyn-1-yl bromide under 60 ml. of anhydrous ethyl ether. A solution of 3.0 grams of 3-methoxyestra-2,5(10)-dien-17-one in 50 ml. of tetrahydrofuran was added dropwise (25 minutes) at 5° C. to the Grignard mixture. The mixture was then reacted at 25° C. for 90 minutes. The Grignard adduct was then cooled to 10° C. and 100 mg. of ditert butyl methyl phenol added. This mixture was then decomposed by the dropwise addition of 100 ml. of 5% sodium hydroxide solution. A gelatinous mass formed which was filtered after setting 15 minutes at room temperature. The filtrate was washed 3 times with 25 ml. of ethyl acetate. The filtrate and washings were then washed with water (3× 25 ml.), dried with Na₂SO₄ and evaporated to dryness. An oily residue was obtained and the 17α - (2′ - butyn - 1′ - yl)-3-methoxyestra-2,5(10)-dien-17β-ol (M.P. 133–139° C.) was crystallized from heptane.

EXAMPLE 2

17α-(2′-butyn-1′-yl)estra-5(10)-en-17β-ol-3-one

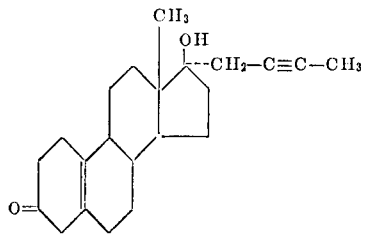

700 mg. of 17α-(2′ - butyn - 1′ - yl)-3-methoxyestra-2,5 (10)-dien-17β-ol (Example 1) was dissolved at room temperature, in a mixture of 18.0 ml. of glacial acetic acid and 2.5 ml. of water. After 2 hours, 50 ml. of water was added and the product extracted wtih (5× 10 ml.) ethylacetate-benzene (1:1). The 17α-(2′-butyn-1′-yl) estra-5(10)-en-17β-ol-3-one was then crystallized from ether (M.P. 110° C.) [α]_D=134.4° (C=1, CHCl₃).

EXAMPLE 3

17α-(2′-Butyn-1′yl)-estra-4-en-17β-ol-3-one

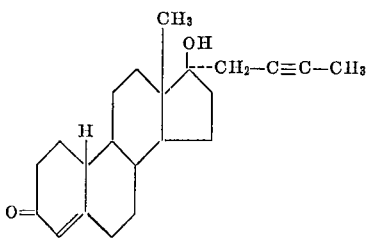

696.5 mg. of 17α - (2′ - butyn - 1′-yl)-3-methoxyestra-2,5(10)-dien-17β-ol (Example 1) were dissolved in 14 ml. of methylene chloride and 7 ml. of methanol containing 0.18 ml. of 11 N aqueous hydrochloric acid were then added. After 20 minutes at 30–35° C., 40 ml. of water were added, the methylene chloride layer was separated and the aqueous phase extracted (3× 5 ml.) with methylene chloride. The residue from the washed (H₂O) and dried (Na₂SO₄) organic layers was crystallized with ether to give 17α-(2'-butyn-1'-yl)estra-4-en-17β-ol-3-one M.P. 105–108.5° C. [α]$_D$=+14.2 (C=1, CHCl$_3$).

EXAMPLE 4

17α-(2',3'-butadien-2'-yl)-estra-4-en-17β-ol-3-one

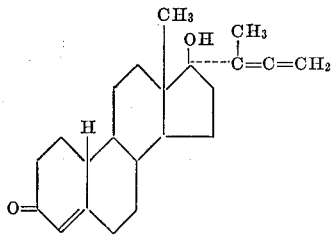

The heptane mother liquor of Example 1 was evaporated to dryness to yield 5.59 g. of a dark oil. This was dissolved in a mixture of 12.5 ml. of methanol and 0.36 ml. of concentrated 11 N aqueous hydrochloric acid and kept at 30° C. for 30 minutes. The solution was then diluted with 40 ml. of water and extracted with methylene chloride to yield 5.5 gms. of an oil. The oil was chromatographed on a silica gel column. The fractions having a selective U.V. absorption at 241 mμ were further purified on preparative thin layer plates with silica gel H carrier. The 17α-(2',3'-butadien-2'-yl)estra-4-en-17β-ol-3-one is eluted (chloroform-methanol 98:2) from a band having an R$_f$ of 0.25 and crystallized from ether, M.P. 122–125° C.

EXAMPLE 5

17α-(2',3'-butadien-2'-yl)-estra-5(10)-en-17β-ol-3-one

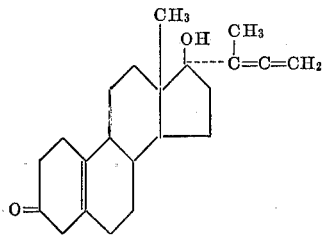

The heptane mother liquor of Example 1 was evaporated to dryness to yield a dark oil. 3.0 g. of this was dissolved in a mixture of 30 ml. of glacial acetic acid and 3 ml. of water. After 2 hours, 200 ml. water was added and the product extracted with ethyl acetate (5× 10 ml.). Evaporation of the ethyl acetate extracts gave an oil, which yielded the title product on chromatography, first on a volume (silica gel), then on preparative thin layer plates with silica gel G as a carrier.

EXAMPLE 6

17α-(2'-butyn-1'-yl)-estra-4-en-17β-ol-3-one

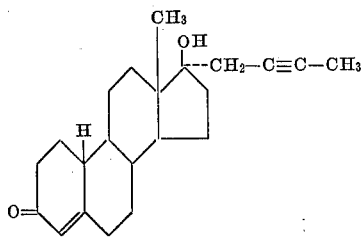

696.5 mg. of 17α-(2'-butyn-1'-yl)estra-5(10)-en-17β-ol-3-one (Example 2) were dissolved in 14 ml. of methylene chloride and 7 ml. of methanol containing 0.18 ml. of 11 N aqueous hydrochloric acid were then added. After 20 minutes at 30–35° C., 40 ml. of water were added, the methylene chloride layer was separated and the aqueous phase extracted (3× 5 ml.) with methylene chloride. The residue from the washed (H$_2$O) and dried (Na$_2$SO$_4$) organic layers was crystallized with ether to give 17α-(2'-butyn-1'-yl)estra-4-en-17β-ol-3-one, M.P. 105–108.5° C. [α]$_D$=+14.2 (C=1, CHCl$_3$).

What is claimed is:

1. A compound of the formula (a)
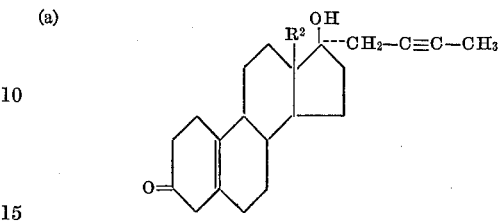

wherein R$^2$ is alkyl having from 1 to 3 carbon atoms, or (b)
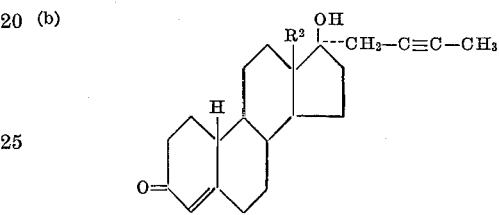

wherein R$^2$ is as defined above.

2. A compound of claim 1 of the formula

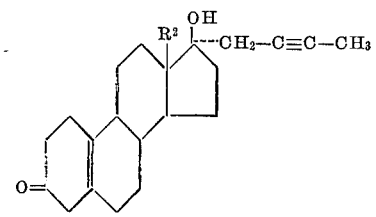

3. A compound of claim 1 of the formula

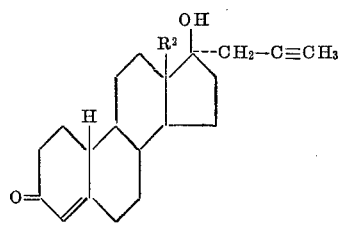

4. The compound of claim 2 which is 17α-2'-butyn-1'-yl)-estra-5(10)-en-17β-ol-3-one.

5. The compound of claim 3 which is 17α-(2'butyn-1'-yl)-estra-4-en-17β-ol-3-one.

6. A pharmaceutical composition comprising a compound of claim 1 and a pharmaceutically acceptable carrier therefor.

References Cited

UNITED STATES PATENTS 3,210,390  10/1965  Meloy _____ 260—397.5
3,392,166  7/1968  Edwards et al. ____ 260—239.55

OTHER REFERENCES

Smith et al.: Jour. Chem. Soc., November 1964, pp. 4472–4492, pages 4476, 4478, 4487 and 4489 relied on.

LEWIS GOTTS, Primary Examiner

E. G. LOVE, Assistant Examiner

U.S. Cl. X.R.

260—397.4, 397.5